(12) United States Patent
Li et al.

(10) Patent No.: US 12,039,270 B2
(45) Date of Patent: Jul. 16, 2024

(54) DISENTANGLE SYNTAX AND SEMANTICS IN SENTENCE REPRESENTATION WITH DECOMPOSABLE VARIATIONAL AUTOENCODER

(71) Applicant: Baidu USA, LLC, Sunnyvale, CA (US)

(72) Inventors: Dingcheng Li, Sammamish, WA (US); Shaogang Ren, Redmond, WA (US); Ping Li, Bellevue, WA (US)

(73) Assignee: Baldu USA LLC, Sunnyvale, CA (US)

( * ) Notice: Subject to any disclaimer, the term of this patent is extended or adjusted under 35 U.S.C. 154(b) by 570 days.

(21) Appl. No.: 16/985,904

(22) Filed: Aug. 5, 2020

(65) Prior Publication Data
US 2022/0043975 A1 Feb. 10, 2022

(51) Int. Cl.
G06F 40/30 (2020.01)
G06F 3/08 (2006.01)
G06F 40/284 (2020.01)
G06N 3/049 (2023.01)

(52) U.S. Cl.
CPC ............ *G06F 40/284* (2020.01); *G06F 40/30* (2020.01); *G06N 3/049* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| 5,740,443 A * | 4/1998 | Carini ................... G06F 8/4441 717/133 |
| 7,584,452 B1 * | 9/2009 | Johnson ................ G06F 9/4484 717/114 |
| 11,042,796 B2 | 6/2021 | Hashimoto |
| 2015/0066496 A1 | 3/2015 | Deoras |
| 2018/0137110 A1 | 5/2018 | Burchard |

(Continued)

FOREIGN PATENT DOCUMENTS

| CN | 108733682 A | 11/2018 |
| CN | 110083710 A | 8/2019 |

(Continued)

OTHER PUBLICATIONS

Chen et al., title={Controllable paraphrase generation with a syntactic exemplar}, 2019, journal={arXiv preprint arXiv:1906.00565},, pp. 1-13 (Year: 2019).*

(Continued)

*Primary Examiner* — Lamont M Spooner
(74) *Attorney, Agent, or Firm* — NORTH WEBER & BAUGH LLP

(57) ABSTRACT

Described herein are embodiments of a framework named decomposable variational autoencoder (DecVAE) to disentangle syntax and semantics by using total correlation penalties of Kullback-Leibler (KL) divergences. KL divergence term of the original VAE is decomposed such that the hidden variables generated may be separated in a clear-cut and interpretable way. Embodiments of DecVAE models are evaluated on various semantic similarity and syntactic similarity datasets. Experimental results show that embodiments of DecVAE models achieve state-of-the-art (SOTA) performance in disentanglement between syntactic and semantic representations.

20 Claims, 7 Drawing Sheets

(56) References Cited

U.S. PATENT DOCUMENTS

| | | | | |
|---|---|---|---|---|
| 2018/0293499 | A1* | 10/2018 | He | G06F 40/30 |
| 2018/0329884 | A1* | 11/2018 | Xiong | G06N 3/044 |
| 2019/0066713 | A1* | 2/2019 | Mesgarani | H04R 25/507 |
| 2019/0130251 | A1 | 5/2019 | Lao et al. | |
| 2019/0236139 | A1 | 8/2019 | DeFelice | |
| 2019/0303669 | A1* | 10/2019 | Spooner | G06N 3/08 |
| 2020/0051325 | A1* | 2/2020 | Younes | G06T 17/00 |
| 2020/0073879 | A1* | 3/2020 | Grabau | G06F 16/93 |
| 2020/0167391 | A1* | 5/2020 | Zheng | G06F 16/3347 |
| 2020/0184339 | A1 | 6/2020 | Li et al. | |
| 2020/0372225 | A1* | 11/2020 | Xu | G06N 3/08 |
| 2021/0012150 | A1* | 1/2021 | Liu | G06F 16/5866 |
| 2021/0027770 | A1* | 1/2021 | Olabiyi | G06N 3/048 |
| 2021/0133535 | A1* | 5/2021 | Zhao | G06N 3/04 |
| 2021/0174784 | A1* | 6/2021 | Min | G06N 3/0442 |
| 2021/0216862 | A1 | 7/2021 | Liu | |
| 2021/0240453 | A1* | 8/2021 | Badlani | G06F 8/42 |
| 2021/0264109 | A1* | 8/2021 | Srinivasan | G06F 40/44 |
| 2022/0012633 | A1* | 1/2022 | Molahalli | H04L 41/50 |

FOREIGN PATENT DOCUMENTS

| | | |
|---|---|---|
| CN | 110688861 A | 1/2020 |
| CN | 111178094 A | 5/2020 |
| CN | 111259142 A | 6/2020 |
| WO | 2020048195 A1 | 3/2020 |

OTHER PUBLICATIONS

Li, title={Syntactically guided text generation}, May 2020, school={Georgia Institute of Technology}}, pp. 1-54 (Year: 2020).*

Zhang, title={Interactive multi-head attention networks for aspect-level sentiment classification}, 2019, journal={IEEE Access}, vol.={7}, pp.={160017-160028} (Year: 2019).*

Author={Balasubramanian, Vikash and Kobyzev, Ivan and Bahuleyan, Hareesh and Shapiro, Ilya and Vechtomova, Olga}, title={Polarized-vae: Proximity based disentangled representation learning for text generation}, journal={arXiv preprint rXiv:2004.10809}, year={Apr. 2020}, pp. 1-8 (Year: 2020).*

Bao et al., title={Generating sentences from disentangled syntactic and semantic spaces}, journal={arXiv preprint rXiv: 1907.05789}, Jul. 2019, pp. 1-11 (Year: 2019).*

Author={Fang, Le}, title={Towards Effective and Controllable Neural Text Generation}, year={May 2020}, school={State University of New York at Buffalo}, pp. 1-88 (Year: 2020).*

Author={Liu, Danyang and Liu, Gongshen}, title={A transformer-based variational autoencoder for sentence generation}, booktitle={2019 International Joint Conference on Neural Networks (IJCNN)}, pp. ={1-7}, (Year: 2019).*

Title={"Mask and Infill": Applying Masked Language Model to Sentiment Transfer}, author={Wu, Xing and Zhang, Tao and Zang, Liangjun and Han, Jizhong and Hu, Songlin}, journal={arXiv preprint arXiv:1908.08039}, year={2019}, pp. 1-7 (Year: 2019).*

Title={Disentangling latent space for vae by label relevant/irrelevant dimensions}, author={Zheng, Zhilin and Sun, Li}, booktitle={Proceedings of the IEEE/CVF Conference on Computer Vision and Pattern Recognition}, pp. ={12192-12201}, 2019 (Year: 2019).*

Title={Disentangling the latent space of (variational) autoencoders for nlp}, author={Brunner et al.1}, booktitle={Advances in Computational Intelligence Systems: Contributions Presented at the 18th UK Workshop on Computational Intelligence, September 5-7, pp. ={163-168}, year={2019}, Springer (Year: 2019).*

Title={Syntax-infused variational autoencoder for text generation}, author={Zhang, Xinyuan and Yang, Yi and Yuan, Siyang and Shen, Dinghan and Carin, Lawrence}, journal={arXiv preprint arXiv:1906.02181}, year={2019}, pp. 1-10 (Year: 2019).*

Zhang et al., title={Syntax-infused variational autoencoder for text generation}, journal={arXiv preprint arXiv:1906.02181}, year={2019}, pp. 1-10 (Year: 2019).*

He et all, title={Deberta: Decoding-enhanced bert with disentangled attention}, and Chen, Weizhu}, journal={arXiv preprint arXiv: 2006.03654}, Jun. 2020. (Year: 2020).*

Mishra et al.,"A Simple Neural Attentive Meta-Learner," arXiv preprint arXiv:1707.03141, 2018. (17pgs).

J. Mitchell, "Decomposing bilexical dependencies into semantic and syntactic vectors," In Proceedings of the 1st Workshop on Representation Learning for NLP, 2016. (10pgs).

Mitchell et al., "Orthogonality of Syntax and Semantics within Distributional Spaces," In Proceedings of the 53rd ACL and the 7th IJNLP, 2015. (10pgs).

Pennington et al.,"GloVe: Global vectors for word representation," In Proceedings of the 2014 Conference on Empirical Methods in Natural Language Processing, Doha, Qatar, A meeting of SIGDAT,a Special Interest Group of the ACL, 2014. (12pgs).

Peters et al.,"Deep contextualized word representations," arXiv preprint arXiv:1802.05365, 2018. (15pgs).

Tenenbaum et al.,"Separating style and content with bilinear models," in Neural Computation, 2000. (37pgs).

R. D. Van Valin Jr,"Exploring the Syntax-Semantics Interface," Cambridge University Press, 2005. (4pgs).

Wieting et al.,"PARANMT-50M: Pushing the Limits of Paraphrastic SentenceEmbeddings with Millions of Machine Translations," In Proceedings of the 56th ACL, pp. 451-462, 2018. (12pgs).

Response filed Jun. 21, 2022, in the related matter U.S. Appl. No. 16/926,525, (19pgs).

Final Office Action, dated Sep. 1, 2022, in the related matter U.S. Appl. No. 16/926,525, (9pgs).

Esmaeili et al.,"Structured Disentangled Representations," In The 22nd International Conference on Artificial Intelligence and Statistics, 2019.(10pgs).

Fu et al.,"Style transfer in text:Exploration and evaluation," In Thirty-Second AAAI Conference on Artificial Intelligence, 2018. (8pgs).

Higgins et al.,"β-VAE:Learning basic visual concepts with a constrained variational framework," In 5th International Conference on Learning Representations, 2017. (22pgs).

Hu et al., "Toward controlled generation of text," arXiv preprint arXiv:1703.00955, 2018. (10pgs).

Iyyer et al.,"Adversarial example generation with syntactically controlled paraphrase networks," arXiv preprint arXiv:804.06059, 2018. (11pgs).

Kim et al.,"Disentangling by factorising," arXiv preprint arXiv:1802. 05983, 2019. (19pgs).

Kingma et al.,"Autoencoding variational bayes," arXiv preprint arXiv:1312.6114, 2014. (14pgs).

Kiros et al.,"Skip-thought vectors," arXiv preprint arXiv:1506. 06726, 2015. (11pgs).

Makhzani et al.,"PixelGAN Autoencoders," arXiv preprint arXiv:1706. 00531, 2017. (16pgs).

Miao et al.,"Neural variational inference for text processing," arXiv preprint arXiv:1511.06038, 2016. (12pgs).

Wiseman et al.,"Learning Neural Templates for Text Generation," arXiv preprint arXiv:1808.10122, 2019. (14pgs).

Yin et al.,"Deep reinforcement learning for chinese zero pronoun resolution," In Proceedings of the 56th ACL, 2018. (10pgs).

Zhou et al.,"Multi-space Variational Encoder-Decodersfor Semi-supervised Labeled Sequence Transduction," arXiv preprint arXiv:1704. 01691, 2017. (11pgs).

Chen et al.,"Variational Sequential Labelers for Semi-Supervised Learning," arXiv preprint arXiv:1906.09535, 2019. (12pgs).

Qi Chen et al.,"Isolating Sources of Disentanglement in Variational Autoencoders,"[online], [Retrieved Apr. 30, 2021]. Retrieved from Internet <URL: https://openreview.net/forum?id=BJdMRoClf>, In 6th International Conference on Learning Representations, ICLR 2018, Workshop Track Proceedings, 2018. (18pgs).

Esmaeili et al.,"Structured Disentangled Representations," arXiv preprint arXiv: 1804.02086v, 2018. (17pgs).

Fu et al.,"Style Transfer in Text: Exploration and Evaluation," arXiv preprint arXiv: 1711.06861, 2017. (9pgs).

(56) References Cited

OTHER PUBLICATIONS

Higgins et al., "β-VAE: Learningbasicvisualconcepts With Aconstrainedvariationalframework," In 5th International Conference on Learning Representations, ICLR 2017, Conference Track Proceedings. (22pgs).
Shen et al., "Deep Active Learning for Named Entity Recognition," arXiv preprint arXiv: 1707.05928, 2018. (15pgs).
Tenenbaum et al., "Separating Style and Content with Bilinear Models," [online], [Retrieved Apr. 30, 2021]. Retrieved from Internet <URL: https://doi.org/10.1162/089976600300015349> 2000. (37pgs).
Wieting et al., "ParaNMT-50M: Pushing the Limits of Paraphrastic Sentence Embeddings with Millions of Machine Translations," In Proceedings of the 56th Annual Meeting of the Association for Computational Linguistics, ACL 2018. (12pgs).
Zhao et al.,"Adversarially Regularized Autoencoders," arXiv preprint arXiv:1706.04223, 2018. (16pgs).
Non-Final Office Action, received Mar. 21, 2022, in the related matter U.S. Appl. No. 16/926,525, (8pgs).
Iyyer et al., "Adversarial Example Generation with Syntactically Controlled Paraphrase Networks," arXiv preprint arXiv:1804.06059, 2018. (11pgs).
Makhzani et al.,"Adversarial Autoencoders," arXiv preprint arXiv:1511.05644, 2016. (16pgs).
Mathieu et al.,"Disentangling factors of variation in deep representation using adversarial training," arXiv preprint arXiv: 1611.03383, 2016. (12pgs).
J. Mitchell,"Decomposing Bilexical Dependencies into Semantic and Syntactic Vectors," In Proceedings of the 1st Workshop on Representation Learning for NLP, Rep4NLP@ACL 2016. (10pgs).
Mitchell et al.,"Orthogonality of Syntax and Semantics within Distributional Spaces," In Proceedings of the 53rd Annual Meeting of the Association for Computational Linguistic and the 7th International Joint Conference on Natural Language Processing of the Asian Federation of Natural Language Processing, ACL 2015. (10pgs)..
Reed et al.,"Learning to Disentangle Factors of Variation with Manifold Interaction," In Proceedings of the 31th International Conference on Machine Learning, ICML 2014. (9pgs)..
Response filed Nov. 1, 2022, in the related matter U.S. Appl. No. 16/926,525, (12pgs).
Notice of Allowance and Fee(s) Due dated Nov. 21, 2022, in the related matter U.S. Appl. No. 16/926,525, (18pgs).
Notice of Allowance and Fee(s) Due dated Jun. 28, 2023, in the related matter U.S. Appl. No. 16/926,525, (11pgs).
Blei et al., "Latent dirichlet allocation," Journal of Machine Learning, Research 3, 2003. (30pgs).
Burgess et al., "MONet:Unsupervised scene decomposition and representation," arXiv preprint arXiv:1901.11390, 2019. (22pgs).
Cer et al.,"SemEval-2017 Task 1: Semantic Textual Similarity Multilingual and Crosslingual Focused Evaluation," In Proceedings of the 11th International Workshop on Semantic Evaluation, Association for Computational Linguistics, 2017. (14pgs).
Chen et al., "Variational sequential labelers for semi-supervised learning," 2019 In Proceedings of the Conference on Empirical Methods in Natural Language Processing, Association for Computational Linguistics, 2018. (12pgs).
Chen et al.,"A multi-task approach for disentangling syntax and semantics in sentence representations," arXiv preprint arXiv:1904.01173, 2019. (13pgs).
Chen et al., "InfoGAN:Interpretable representation learning by information maximizing generative adversarial nets," arXiv preprint arXiv:1606.03657, 2016. (14pgs).
Conneau et al., "Supervised learning of universal sentence representations from natural language inference data," arXiv preprint arXiv:1705.02364, 2018. (12pgs).
Devlin et al., "BERT: Pre-training of deep bidirectional transformers for language understanding," arXiv preprint arXiv:1810.04805, 2019. (16 pgs).
Chinese Office Action dated Oct. 7, 2023, in Chinese Application No. 202110267233.8. (9pgs).
Mingda Chen et al., "A Multi-Task Approach for Disentangling Syntax and Semantics in Sentence Representations," arXiv preprint arXiv: 1904.01173, 2019. (13 pgs).

\* cited by examiner

_500_

DISENTANGLE SYNTAX AND SEMANTICS IN SENTENCE REPRESENTATION WITH DECOMPOSABLE VARIATIONAL AUTOENCODER

BACKGROUND

A. Technical Field

The present disclosure relates generally to systems and methods for computer learning that can provide improved computer performance, features, and uses. More particularly, the present disclosure relates to systems and methods to disentangle syntax and semantics with a variational autoencoder (VAE).

B. Background

Deep neural networks have achieved great successes in many domains, such as computer vision, natural language processing, recommender systems, etc. Recent neural disentanglement models based on generative adversarial network (GAN) or VAE have significantly advanced the task of topic segmentation and object/entity attribute separations in computer vision and natural language processing. However, current models still work on coarse levels in the disentanglement of closely related properties, such as syntax and semantics in human languages.

Accordingly, what is needed are systems and methods to disentangle syntax and semantics for improved performance.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
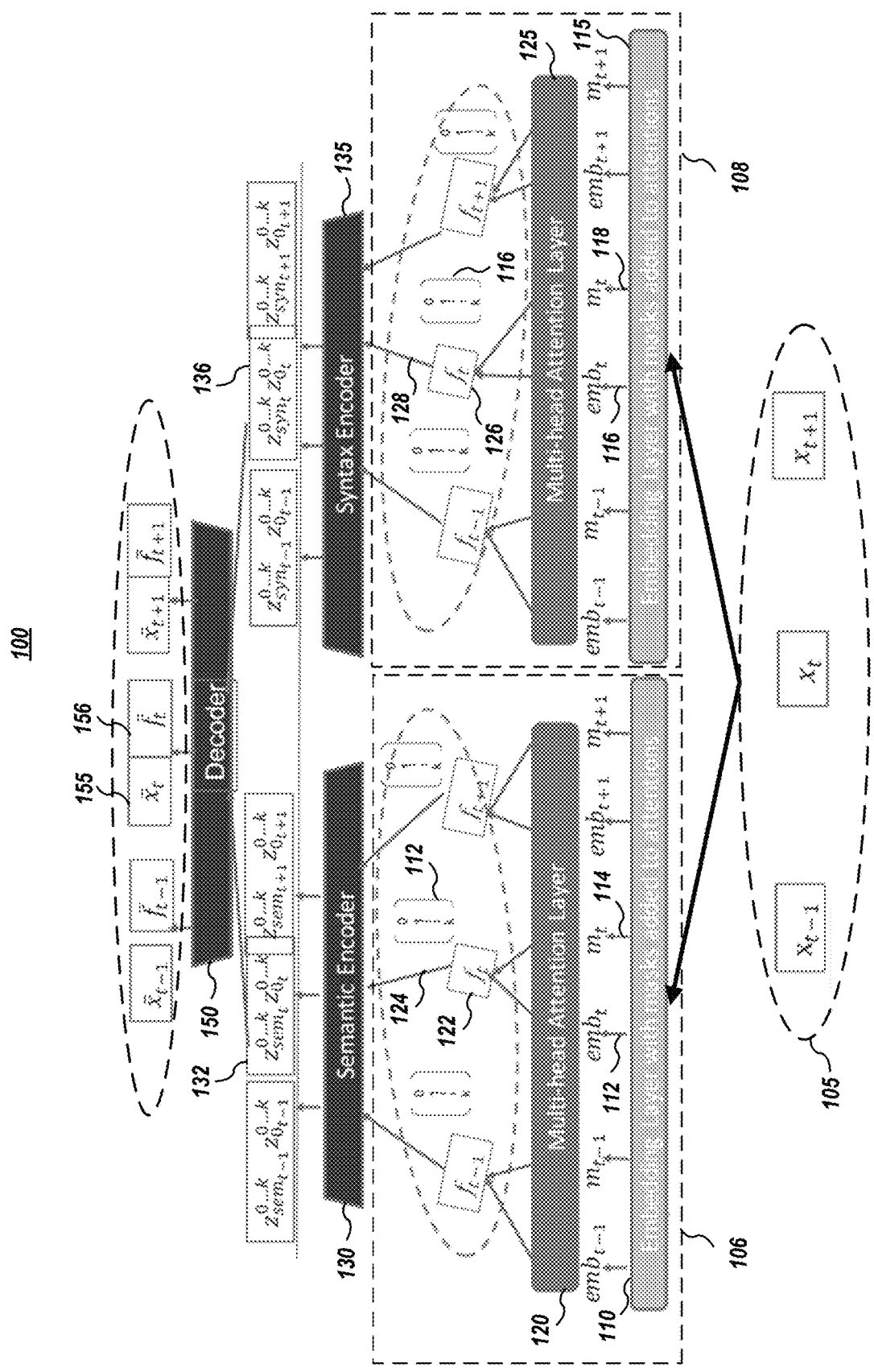
FIG. 1 depicts a structure of a decomposable variational autoencoder (DecVAE), according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of natural language processing, aspects of the present disclosure are not so limited. Accordingly, the aspects of the present disclosure may be applied or adapted for use in other contexts.

A. General Introduction

There is a growing interest on learning interpretable or disentangled latent representations in machine learning, computer vision as well as natural language processing (NLP). Disentanglement is essentially a task to separate latent factors of variation in the data and further learn interpretable semantic information. Factorial representations, those with statistically independent variables, obtained usually in unsupervised or semi-supervised fashions, distill information into a compact form which is semantically meaningful and useful for diverse applications.

In NLP, disentanglement has been used to separate representation of attributes such as sentiment from contents, understanding subtleties in topic modeling, learning sentence representations that split the syntax and the semantics of a sentence. They are further used to control text generation better or for the purpose of calculating the semantic or syntactic similarity between sentences.

One or more embodiments of the present disclosure focus on disentangling syntax and semantics within sentences, although the disentangling framework is generic and may be applied to other tasks. One reason for selecting this task is due to little work on this aspect. Meanwhile, the disentanglement of syntax and semantics may bring considerable improvements in natural language understanding or natural language generation in both accuracy (more understanding of diverse hidden language structure and semantic subtleties) and efficiency (significantly reducing the requirement for annotated data).

Some proposed a deep generative model to disentangle syntax and semantics claims. The generative model comprises of von Mises Fisher (vMF) and Gaussian priors on the semantic and syntactic latent variables respectively, and a deep bag-of-words (BOW) decoder which conditions on these latent variables. Their work is the first one focusing on separation of syntax and semantics from hidden variables with a disentangling approach. However, their approach lacks fine-grained decomposition and thus may fail to disentangle syntax and semantics more subtly. To resolve this weakness, embodiments of a DecVAE are disclosed in the present disclosure to enable hidden variables to be more factorable. Specifically, total correlation is introduced into VAE as a penalty so that deeper and meaningful factorization may be obtained.

For comparisons, learned semantic representations are evaluated on one or more semantic textual similarity (STS) datasets. In one or more embodiments, the syntactic structure of an unseen sentence is predicted to be the one similar to its nearest neighbor, which is determined by the latent syntactic representation in a large dataset of annotated sentences. Experiments demonstrated that embodiments of the present disclosure achieve the best performance on all tasks when the learned representations are most disentangled.

Some contributions of the present disclosure may be highlighted as follows. Firstly, embodiments of a generic DecVAE to disentangle language topics based on total correlation of Kullback-Leibler (KL) divergence are disclosed. Secondly, embodiments of a multi-head attention network are introduced to cluster embedding vectors so that corresponding word embeddings are more discriminative. Thirdly, integrating DecVAE in the task of disentangling syntax from semantics achieves state-of-the-art (SOTA) performances, thus showing the effectiveness of embodiments of the DecVAE.

B. Some Related Work

In this section, disentanglement and its relevant work in the past few years in this field are briefly reviewed. Some related works on the disentanglement in NLP are reviewed with some discussions on disadvantages in those works and how those disadvantages may be addressed using embodiments of the present disclosure.

1. Learning Disentangled Representation

Variational autoencoder (VAE) is a latent variable model that pairs a top-down generator with a bottom-up inference network. Different from traditional maximum-likelihood estimation (MLE) approach, VAE training is done by evidence lower bound (ELBO) optimization in order to overcome the intractability of MLE. Essentially, the objective function of VAE may be represented as follows:

$$\mathcal{L}_\beta = \frac{1}{N}\sum_{n=1}^{N}\{\mathbb{E}_q[\log p(x_n \mid z)] - \beta KL(q(z \mid x_n)\|p(z))\} \quad (1)$$

When $\beta=1$, it is the standard VAE while it is $\beta$-VAE when $\beta>1$. The standard VAE optimizes ELBO averaged over the empirical distribution. In contrast, $\beta$-VAE attempts to learn a disentangled representation by optimizing a heavily penalized objective with $\beta>1$. This encoder will be forced to match the factorized Gaussian priors and introduce additional constraints on the capacity of the latent bottleneck.

By further breaking down the KL term, a Pixel-GAN autoencoder may be obtained as:

$$\mathbb{E}_{p(x)}(KL(q(z|x_n)\|p(z)))=I(x;z)+KL(q(z)\|p(z)) \quad (2)$$

Where $I(x; z)$ is the mutual information under the joint distribution $p(x)(z|x)$. Penalizing the $KL(q(z)\|p(z))$ term pushes $q(z)$ towards the factorial prior $p(z)$, encouraging independence in the dimensions of $z$ and thus disentangling.

Although mutual information penalization encourages disentangling, it may lead to poor reconstructions for high values of $\beta$ since information reduction results in insufficient information about the observation in the latent space, making it impossible to recover the true factors.

Penalizing $I(x;z)$ more than a VAE is neither necessary nor desirable for disentangling. This is shown in an information-theoretic extension to the generative adversarial network (InfoGAN), a variant of GAN. Via maximizing the mutual information between the observation and a small subset of latent variables (denoted as I(x;z)), InfoGAN encourages an interpretable latent representation.

Alternatively, FactorVAE, a method that disentangles by encouraging the distribution of representations to be factorial and hence independent across the dimensions, approaches this problem with a total correlation penalty. It achieves similar disentangling results while keeping good quality of reconstruction. It augments the VAE objective with a term that directly encourages independence in the code distribution, arriving at the following objective:

$$\frac{1}{N}\sum_{n=1}^{N}[\mathbb{E}_{q(z|x_n)}[\log p(x_n \mid z)] - KL(q(z \mid x_n) \| p(z)) - \gamma KL(q(z) \| \bar{q}(z))] \quad (3)$$

Where $\bar{q}(z)=\Pi_{j=1}^{k}q(z_j)$. This is also a lower bound on the marginal log likelihood $\mathbb{E}_{p(x)}[\log p(x)]$. $KL(q(z)\|\bar{q}(z))$ is known as Total Correlation (TC), a measure of dependence for multiple random variables.

2. Disentanglement in NLP

As mentioned in the section of General Introduction, disentanglement in NLP involves diverse applications. For example, it has been used in sentence sentiment analysis and style transfer, morphological reinflection, semantic parsing, text generation, sequential labeling, text-based VAE, and separation of syntax and semantics as well as their interplays.

The last task may be quite challenging since syntax and semantics are entangled to a large degree. Except under some cases where there are no ambiguities, such as some unique proper names, more often than not, it is hard to find absolute borderlines among words, phrases or entities.

Although much work has been done on grammatical and semantic analysis, not many explorations on disentangling syntax and semantics have been made yet. Some proposed a vMF-Gaussian Variational Autoencoder (VGVAE) with an assumption that a sentence is generated by conditioning on two independent variables: semantic variable $z_{sem}$ and syntactic variable $z_{syn}$. For inference, VGVAE assumes a factored posterior will be produced and a lower bound on marginal log-likelihood will be maximized in the generative process.

In VGVAE, the corresponding inference and generative models are two independent word averaging encoders with additional linear feed-forward neural networks and a feed-forward neural network with the output being a bag of words. Alternatively, VGVAE also considers replacing both generative and inference models with RNN-based sequence models. During the training, multi-task training is employed by minimizing three losses (paraphrase reconstruction loss, discriminative paraphrase loss, and word position loss) sequentially.

Compared with VGVAE, one or more embodiments of the present disclosure aim to construct a decomposable VAE by deploying the decomposability of KL divergence, thus discovering more subtle topics from the hidden variables. Consequently, embodiments of the decomposable VAE framework may implement a better disentanglement with fine-grained decomposed topics. Further, in one or more embodiments, regularities may be flexibly added to guide the decomposition so that more interpretable and controllable elements may be generated from decoders.

C. Embodiments for Disentangling Semantic and Syntactic Information

Although the present disclosure is applicable to any disentangled tasks in NLP, one or more embodiments are focused on disentangling semantic and syntactic information from sentence representations. Also, for fair comparisons, one or more embodiments of the present disclosure are constructed incrementally from VGVAE, although the embodiments may be built from any basis model.

1. Embodiments of Decomposable VAE Model

One or more embodiments of a generative model named Decomposable VAE (DecVAE) are disclosed. One or more embodiments of the DecVAE model are essentially based on a VAE comprising a term of computing log-likelihood of input data given latent variables, and terms of computing KL divergences between posterior variational probabilities of hidden variables given input data and the prior probabilities of hidden variables as shown in Equation 1. Under the context of NLP task, embodiments of the DecVAE may be defined in more domain-relevant means.

In one or more embodiments, $x_1, \ldots x_N$ is given as a sequence of N tokens (words), conditioned on a continuous latent variable z. In a usual practice, e.g., like an assumption in Latent Dirichlet Allocations (LDA), a conditional independence assumption of words on z may be described as:

$$p_\theta(x_1, \ldots, x_N) = \int \prod_{n=1}^{N} p_\theta(x_n \mid z) p_\theta(z) dz \quad (4)$$

In one or more embodiments, model parameters may be learned using the variational lower-bound:

$$\mathcal{L}(\theta, \phi, x) \geq \frac{1}{N}\sum_{n=1}^{N}[\mathbb{E}_{q_\phi}[\log p_\theta(x_n \mid z)] - KL(q_\phi(z \mid x_n) \| p_\theta(z)) \quad (5)$$

Where $q_\phi(z|x_n)$ is the encoder (also called recognition model or inference model), parameterized by $\phi$, i.e., the approximation to the intractable, true posterior $p_\theta(z|x_n)$. The distribution $p_\theta(z)$ is the prior for z. Based on observation that different words or phrases in sentences stand for different entities that play different roles, either grammatical or semantic, and potentially interact each other, the generations of latent variables in the VAE may be guided corresponding to entities in sentences by designing VAE of decomposable latent variables. Further, the reconstruction network may generate words or phrases sequentially.

In one or more embodiments, DecVAE may identify hierarchically independent topics in human languages, which may be regarded as a manifold since it is hierarchically organized, and the corresponding grammar and the semantics interact in an intricate space. Embodiments of DecVAE may use a decoder that maps a latent space $\mathcal{Z}$ (learned with the encoder of the input samples) to this language manifold X. In one or more embodiments, $z=z_0 z_1 \ldots z_K \in \mathcal{Z}$ represents the latent variable of the decoder in which $z_i$ represents the i-th topic of the latent variables. In one or more embodiments, $\bar{x}=\bar{x}_1 \ldots \bar{x}_K$ represents the variables for the output of the decoder, here variables $\bar{x}_1 \ldots \bar{x}_K$ mean K topics instead of the variable being sequential. $z_i$ controls the properties of i-th topic, $x_i$. In one or more embodiments, it is assumed that the topics are conditionally independent with each other given the latent variables, i.e., $x_i \perp x_j | z_k$, if $i \neq j$, where $z_k$ controls the specific properties of topic k.

In one or more embodiments, a DecVAE may have the following independent assumption about the topics and latent variables:

$$x_i \perp z_j | z_0(j), \text{ if } i \neq j \quad (6)$$

Where $z_0(j)$ is a global latent variable, a special latent variable encoding the overall properties of the generated sentences and the correlations between different grammatical and semantic topics. It shall be noted that in Equation (6), the original $z_0$ is split into k parts, with each corresponding to $z_0(j)$. In one or more embodiments, distributions for generated sentences may be derived as, $$p(x_1 x_2 \ldots x_K | z) = \\ p(x_1 x_2 \ldots x_K | z_1 z_2 \ldots z_K) = \prod_{k=1}^{K} p(x_k | z_1 z_2 \ldots z_K) = \prod_{k=1}^{K} p(x_k | z_0(k) z_k) \quad (7)$$

In one or more embodiments, the DecVAE model derived in this way may encode each topic's individual features (individual tokens or words or phrases) as well as the global latent factors for the whole sentence.

A prior VAE model incorporated total correlation of KL divergence and global latent factors in outputs from a semantic encoder and a syntax encoder as described in U.S. patent application Ser. No. 16/926,525 (Docket No. 28888-2404), filed on 10 Jul. 2020, entitled "TOTAL CORRELATION VARIATIONAL AUTOENCODER STRENGTHENED WITH ATTENTIONS FOR SEGMENTING SYNTAX AND SEMANTICS," which is incorporated by reference herein in its entirety. Embodiments in the aforementioned patent document may be referred to herein as total correlation variational autoencoder or TC_VAE.

2. Embodiments of Objective Function

In one or more embodiments, the two terms of calculating KL divergence following Equation 2 are decomposed. Meanwhile, following DecVAE embodiments in Section C.1, a global controller variable $z_0$ is added. In one or more embodiments, it is observed that disentangling syntax and semantics in language has some similarities to topic segmentation in computer vision. Some recent work, e.g., a Multi-Object Network (MONet), shows that an attention network layer improves topic segmentation as well as topic disentanglement. In NLP community, it has also been proved that attention layers play important roles in boosting performance. In one or more embodiments of the present disclosure, one additional variable f is added to condition z. In one or more embodiments, an equation for syntax based on the decomposable nature of latent variables may be defined as following, $$KL(q_\phi(z_{syn} | x) \| p_\theta(z_{syn})) = \\ I_{q_\phi}(x, f_k; z_{syn}^k, z_0^k) + \sum_{i,j} \left[ KL(q(z_{syn}^{ki}, z_0^j) \| p(z_{syn}^{ki}, z_0^j)) + \\ \beta KL\left(q_\phi(z_{syn}^k, z_0) \middle\| \left( \prod_i q_\phi(z_{syn}^{ki}) \prod_j q_\phi(z_0^j) \right) \right) \right] \quad (8)$$

In one or more embodiments, an equation for semantics based on the decomposable nature of latent variables may be defined as following as following, $$KL(q_\phi(z_{sem} | x) \| p_\theta(z_{sem})) = I_{q_\phi}(x, f_k; z_{sem}^k, z_0^k) + \sum_{i,j} \left[ \\ KL\left(q(z_{sem}^{ki}, z_0^j) \| p((z_{sem}^{ki}, z_0^j)) + \beta KL(q_\phi(z_{sem}^k, z_0) \| \left( \prod_i q_\phi(z_{sem}^{ki}) \prod_j q_\phi(z_0^j) \right) \right) \right] \quad (9)$$

In one or more embodiments, the total correlation (TC) is penalized for enforcing disentanglement of the latent factors. To compute the second term, a weighted version is used for estimating the distribution value of q(z). Given a mini-batch of size M, i.e., $\{x_1, \ldots, x_M\}$ that sampled from a set with size N without replacement, $p(B_M)$ is the uniform on all mini-batches of size M, then, the following holds, $$q(z) = \frac{M}{N} \left[ \frac{1}{M} \sum_{m=1}^{M} [q(z|n_m) | n^* \in B_M] + \frac{N-M}{N} \left[ \frac{1}{M} \sum_{m=1}^{M} \left[ q(z|n_m) | n^* \notin B_M \right] \right] \quad (10)$$

3. Embodiments of Network Structure

Figure 2:
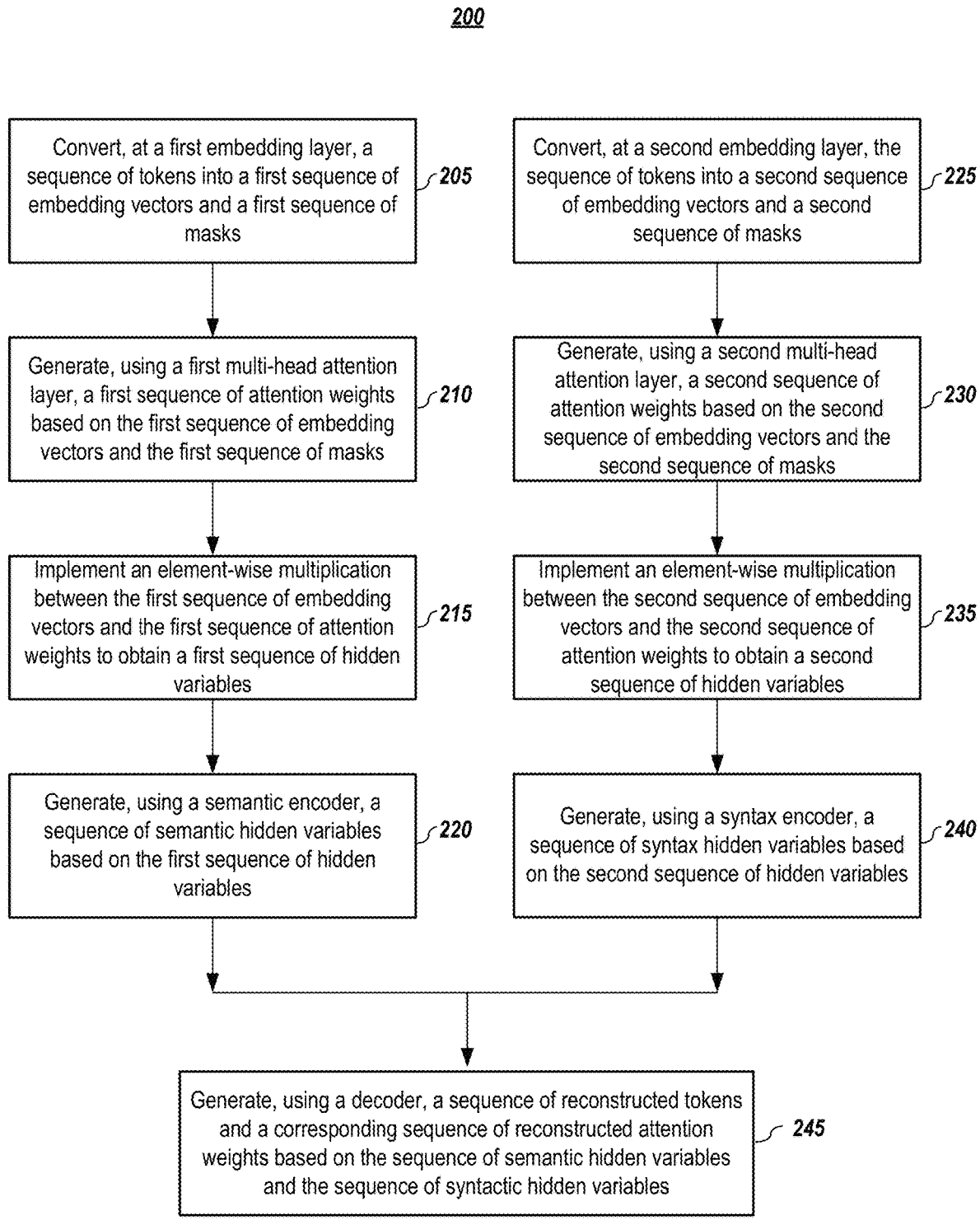
FIG. 2 depicts a process for disentangling syntax and semantics in sentence representation, according to embodiments of the present disclosure.

FIG. 1 depicts a network structure of a DecVAE 100, according to embodiments of the present disclosure. FIG. 2 depicts a process 200 for disentangling syntax and semantics in sentence representation using the DecVAE 100, according to embodiments of the present disclosure. As shown in FIG. 1, the DecVAE comprises two embedding layers 110 and 115, two attention layers 120 and 125, a semantic encoder 130, a syntax encoder 135 separate from the semantic encoder 130, and decoder 150. In one or more embodiments, different from the usual network structure, the first three layers comprise three parallel independent layers, one set of three layers for semantic and one set of three layers for syntax—the first set of three layers comprises the first embedding layer 110, the first attention layer 120, and the semantic encoder 130, which are parallel and independent from the second set of three layers, which comprises the second embedding layer 115, the second attention layer 125, and the syntax encoder 135. In one or more alternative embodiments, one or more layers of a first combination 106 (comprising the first embedding layer 110 and the first attention layer 120) and one or more layers of a second combination 108 (comprising the second embedding layer 115 and the second attention layer 125) may share parameters or may be shared layer(s). For example, in one or more embodiments, the first embedding layer and the second embedding layer may share parameters (i.e., may be the same layer used by both the semantic and syntax pathways).

With the first combination mainly or fully focused on semantic and the second combination mainly or fully focused on syntax, the DecVAE 100 may have at least partially separate structure components designated for extracting semantic and syntactic features respectively without needing to make comprisal between semantic and syntactic. Therefore, the hidden variables input to the decoder may be decomposed into semantic component and syntactic component in a clear-cut line. Each of the attention layers yields K attention weights, so that ensemble of K weighted embeddings are working in both semantic and syntax encoders.

In one or more embodiments, the network structure shown in FIG. 1 and the process shown in FIG. 2 may be applicable to both model training and inference. In response to a training process, a sequence of reconstructed tokens 155, e.g., words or phrases, $\bar{x}$, and/or a corresponding sequence of reconstructed attention weights 156 may be used in one or more loss functions. In response to an inference process, the sequence of reconstructed tokens and/or the corresponding sequence of reconstructed attention weights may be used, e.g., as fine-grained representation of words and sentences, in one or more NLP applications, such as in controllable text generation. The fine-grained representation of words and sentences may bring considerable improvements in natural language understanding or natural language generation in both accuracy (more understanding of diverse hidden language structure and semantic subtleties) and efficiency (significantly reducing the requirement for annotated data).

Given an input sentence or expression comprising a sequence of tokens 105 (e.g., words) $x_1, \ldots, x_N$, the first embedding layer 110 converts (205) the tokens into a first sequence of embedding vectors $emb_t$ 112. In one or more embodiments, the first embedding layer 110 incorporates attention mechanism and also outputs a first sequence of masks $m_t$ 114, with each mask $m_t$ showing whether each word or phrase $x_t$ appears in each sentence. The first sequence of embedding vectors and the first sequence of masks from the first embedding layer are entered into a first multi-head attention layer 120 to generate (210) a first sequence of attention weights $f_t$ 122. An element-wise multiplication is implemented between the embedding of $x_t$ and its attention weight $f_t$ to obtain (215) a first sequence of hidden variables 124. In one or more embodiments, steps of 205-215 are implemented using the first combination comprising the first embedding layer and the first attention layer. The semantic encoder 130 receives the first sequence of hidden variables 124 and generates (220) a sequence of semantic hidden variables $z_{sem_t}^{0 \cdots k} z_{0_t}^{0 \cdots k}$ 132.

In one or more embodiments, in parallel, the second embedding layer 115 converts (225) the tokens 105 into a second sequence of embedding vectors $emb_t$ 116. In one or more embodiments, the second embedding layer 115 incorporates attention mechanism and also outputs a second sequence of masks $m_t$ 118, with each mask $m_t$ showing whether each word or phrase $x_t$ appears in each sentence. The second sequence of embedding vectors and the second sequence of masks from the second embedding layer are entered into a second multi-head attention layer 125 to generate (230) a second sequence of attention weights $f_t$ 126. An element-wise multiplication is implemented between the embedding of $x_t$ and its attention weight $f_t$ to obtain (235) a second sequence of hidden variables 128. In one or more embodiments, steps of 225-235 are implemented using the second combination comprising the second embedding layer and the second attention layer. The syntax encoder 135 receives the second sequence of hidden variables 128 and generates (240) a sequence of syntactic hidden variables $z_{syn_t}^{0 \cdots k} z_{0_t}^{0 \cdots k}$ 136.

As shown in FIG. 1, since both semantics and syntax of input sentences are modeled, the attention procedure is processed twice with different and independent initializations. The results are passed into semantic encoder and syntax encoder, respectively. Each encoder yields its hidden variables, $z_{sem_t}^{0 \cdots k} z_{0_t}^{0 \cdots k}$ or $z_{syn_t}^{0 \cdots k} z_{0_t}^{0 \cdots k}$.

In one or more embodiments of DecVAE, different from MONet in which $f_k$ is generated sequentially with an attention network, all attentions 122 and 126 are generated at once with multi-head attention. In one or more embodiments, the multi-head attention may essentially be a transformer model. In one or more embodiments, to incorporate recurrent neural network, a DecVAE may have a structure in which a self-attention mechanism from a transformer is combined with a temporal convolution. The topic K in computer vision (CV) applications looks more like a segment, while it is more like a cluster or a topic in NLP. In one or more embodiments of DecVAE, the elementwise multiplication between embedding vector and attention masks generates hidden vectors, which are in turn put into semantic encoder and syntax encoder respectively to be encoded as a pair of variables $z_k$, $z_0(k)$.

In one or more embodiments, the two groups of hidden topic vectors, also-known-as the semantic hidden variables 132 and the syntactic hidden variables 136, are concatenated together into the decoder to generate (245) a sequence of reconstructed tokens 155, e.g., words or phrases, $\bar{x}$, and a corresponding sequence of reconstructed attention weights 156 $\bar{f}_k$, similar to a topic assignment.

In one or more embodiments, the sequence of semantic hidden variables $z_{sem_t}^{0 \cdots k} z_{0_t}^{0 \cdots k}$ comprises a plurality of local semantic hidden variables $z_{sem_t}^{0 \cdots k} z_{0_t}^{0 \cdots k}$ and a plurality of global hidden variables $z_{0_t}^{0 \cdots k}$, the sequence of syntactic hidden variables $z_{syn_t}^{0 \cdots k} z_{0_t}^{0 \cdots k}$ comprises a plurality of local syntactic hidden variables $z_{syn}^{0 \cdots k}$ and a plurality of global hidden variables $z_{0_t}^{0 \cdots k}$.

In one or more embodiments, the global latent variable $z_0$ is a special latent variable encoding overall properties of the generated sentences and correlations between different grammatical and semantic topics. In one or more embodiments, the sequence for the global latent variable $z_0$ may be obtained based on the local semantic hidden variables $z_{sem}^{0 \cdots k}$ and the local syntactic hidden variables $z_{syn}^{0 \cdots k}$. In one or more embodiments, the global latent variable $z_0$ may be a concatenation of the local semantic hidden variables $z_{sem_t}^{0 \cdots k}$ and the local syntactic hidden variables $z_{syn_t}^{0 \cdots k}$. In one or more embodiments, the global hidden variables in the sequence of semantic hidden variables may be the same as the global hidden variables in the sequence of syntactic semantic hidden variables. In one or more embodiments, the global hidden variables in the sequence of semantic hidden variables may not be the same as the global hidden variables in the sequence of syntactic semantic hidden variables. For purpose of differentiation, the global hidden variables in the sequence of semantic hidden variables may be identified as global semantic hidden variable $z_{sem(0)}^k$ and the global hidden variables in the sequence of semantic hidden variables may be identified as global syntactic hidden variable $z_{syn(0)}^k$ in some of descriptions hereinafter, while these two global hidden variables $z_{sem(0)}^k$ and $z_{sem(0)}^k$ may or may not be the same.

4. Embodiments of Training and Inference

In one or more embodiments of the present disclosure, with the product ($h_t$) of embedding vector ($emb_t$) and their corresponding focus mask ($f_t$) as the input for the semantic encoder or syntax encoder, ($z^k$, $z_0^k$) as the latent variable and ($\bar{x}$, $\bar{f}^k$) as the output of the decoder, the loss for topic k may be given by:

$$\Psi_k(x, f^k; \theta, \phi, a, e, d) = -\mathbb{E}_{q_\phi e(z^k, z_0^k | x, f^k)}[f^k \log p_\theta^d \\ (x | z^k, z_0^k)] + KL(q\phi e(z^k, z_0^k | x, f^k) \| p(z)) + \gamma KL \\ (q_\phi^a(f^k | x) \| p_\theta^d(\bar{f}^k | z^k, z_0^k)) \quad (11)$$

Here a, e, and d refer to multi-head attention layer, encoder (which may be the semantic encoder and/or the syntax encoder) and decoder layer respectively, θ and ϕ are parameters for the likelihood and variational distribution respectively. The local hidden variable $z_k$ may comprise $z_{sem}^k$ and $z_{syn}^k$; the global hidden variable $z_0^k$ may comprise $z_{sem(0)}^k$ and $z_{syn(0)}^k$. $\gamma$ is a nonnegative value.

In one or more embodiments, a loss for all topics may be expressed as:

$$\mathcal{L}_{VAE}(x; a, e, d) = \sum_{k=1}^{K} \Psi_k(x, f^k; a, e, d) \quad (12)$$

Where a, e, and d are short for attention, encoder, and decoder, respectively. Details of corresponding loss functions are described in section D below.

In one or more embodiments, the loss for topic k may also be a function of embedding layers, e.g., the embedding layers 110 and 115, besides the multi-head attention layer, the encoder layer, and the decoder layer, such that parameters of the embedding layers may also be trained.

D. Embodiments of Loss Function Components

As seen from Equation (11), the loss functions are composed of three parts, which may be extended with the help of the objective functions described in Equation 4 and Equation 5. Concretely, the losses may be defined as three functions. They are paraphrase reconstruction loss (PRL), discriminative paraphrase loss (DPL) and word position loss (WPL).

1. Embodiments of Paraphrase Reconstruction Loss Function

Figure 3:
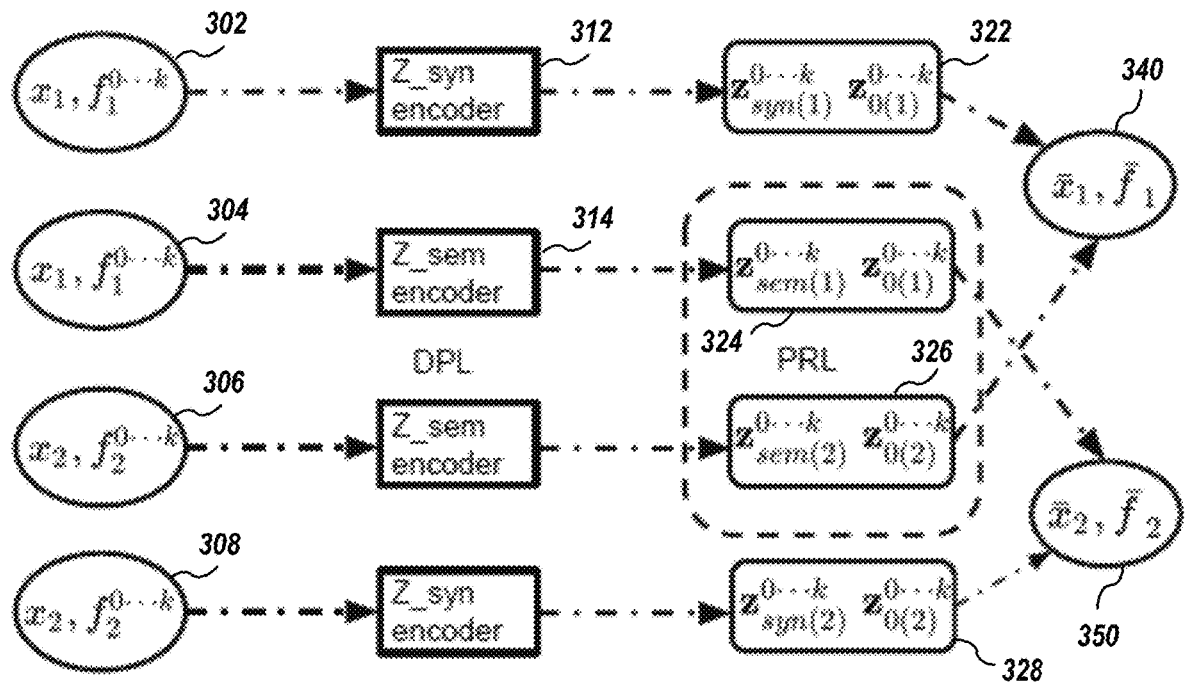
FIG. 3 depicts a diagram for a training process with semantic hidden variables swap, according to embodiments of the present disclosure.
Figure 4:
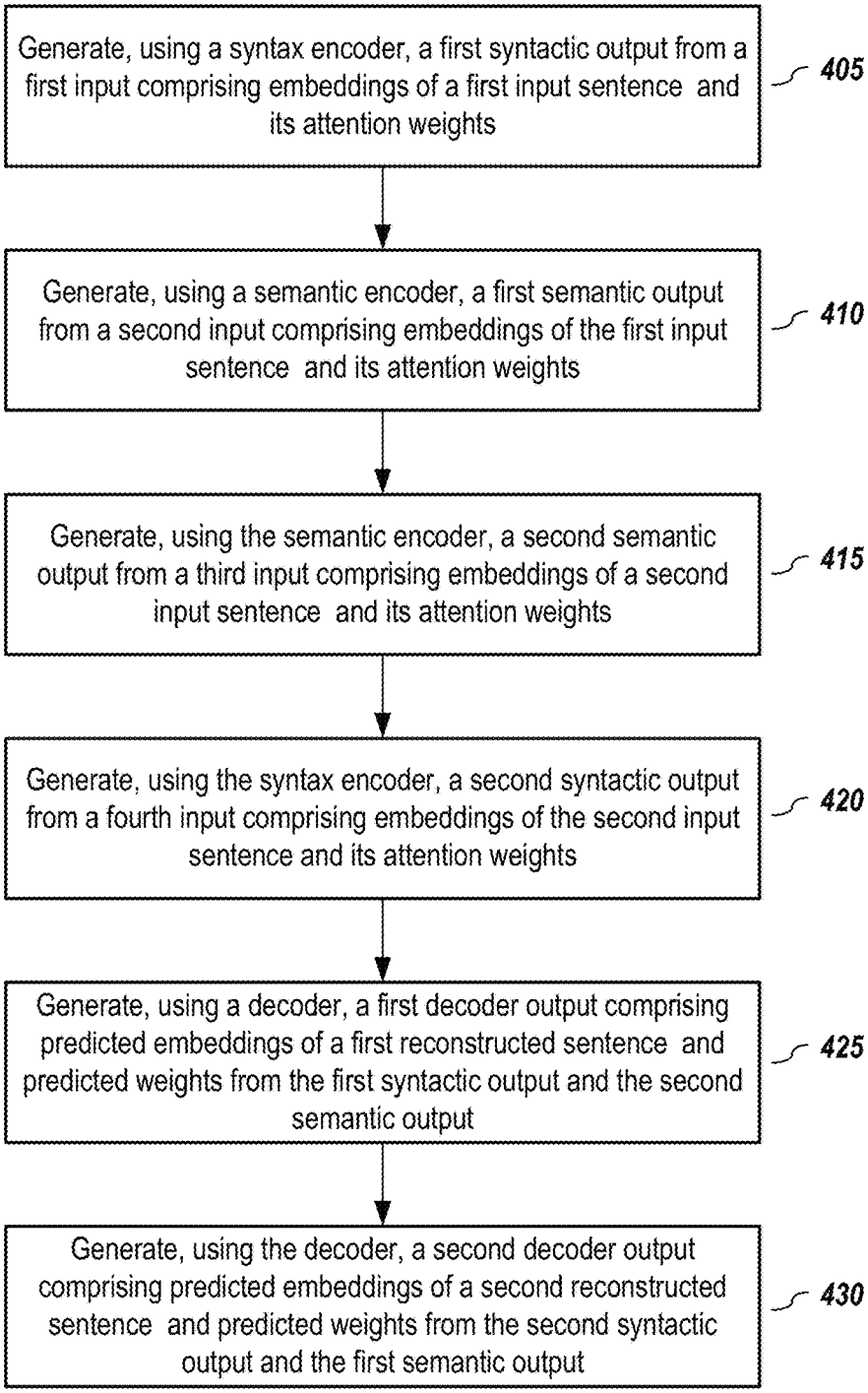
FIG. 4 depicts a process for a training process with semantic hidden variables swap, according to embodiments of the present disclosure.

FIG. 3 depicts a diagram for a training process with semantic hidden variables swap, according to embodiments of the present disclosure. FIG. 4 depicts a process for a training process with semantic hidden variables swap, according to embodiments of the present disclosure.

Typically, training losses may comprise a discriminative paraphrase loss (DPL) and paraphrase reconstruction loss (PRL). In one or more embodiments of the present disclosure, each input of encoders comprises embeddings for words in an input sentence $x_t$ and its attention weights $f^{0 \cdots k}$. Each output of encoders comprises hidden variables ($z_{sem_t}^{0 \cdots k}$ or $z_{syn_t}^{0 \cdots k}$) and $z_{0_t}^{0 \cdots k}$. Each output of decoders comprises predicted embeddings of each sentence $\bar{x}_t$ and their predicted weights $\bar{f}_t$. Due to the increase of variables brought by the DecVAE, more complicated and subtle interactions may get involved. Consequently, stronger discrimination may be obtained, and better results may be obtained accordingly.

As shown of the exemplary embodiment in FIG. 3, a first input 302 comprising embeddings of a first input sentence $x_1$ and its attention weights $f_1^{0 \cdots k}$ is fed into the syntax encoder 312 to generate (405) a first syntactic output 322 comprising hidden variables $z_{syn(1)}^{0 \cdots k}$ and $z_{syn(1)}^{0 \cdots k}$. A second input 304 comprising embeddings of the first input sentence $x_1$ and its attention weights $f_1^{0 \cdots k}$ is fed into the semantic encoder 314 to generate (410) a first semantic output 324 comprising hidden variables $z_{sem(1)}^{0 \cdots k}$ and $z_{syn(1)}^{0 \cdots k}$. According to description of FIG. 1, the first input 302 and the second input 304 may be generated in parallel and independently from each other. Afterwards, a third input 306 comprising embeddings of a second input sentence $x_2$ and its attention weights $f_2^{0 \cdots k}$ is fed into the semantic encoder 314 to generate (415) a second semantic output 326 comprising hidden variables $z_{sem(2)}^{0 \cdots k}$ and $z_{syn(2)}^{0 \cdots k}$. A fourth input 308 comprising embeddings of the second input sentence $x_2$ and its attention weights $f_2^{0 \cdots k}$ is fed into the syntax encoder 312 to generate (420) a second syntactic output 328 comprising hidden variables $z_{syn(2)}^{0 \cdots k}$ and $z_{syn(2)}^{0 \cdots k}$. Similarly, the third input 306 and the fourth input 308 may be generated in parallel and independently from each other. In one or more embodiments, the sentences $x_1$ and $x_2$ may have paraphrase relationships, e.g., $x_1$ and $x_2$ may be modeled to be generated with the same or similar semantic latent variables but with different syntactic latent variables.

In one or more embodiments, the semantic variables are also swapped while the syntactic variables are kept to reconstruct the sentences. As shown in FIG. 3, a first decoder output 340 comprising predicted embeddings of a first reconstructed sentence $\bar{x}_1$ and predicted weights $\bar{f}_1$ is generated (425) from the first syntactic output 322 and the second semantic output 326, instead of from the first syntactic output 322 and the first semantic output 324. In other words, the first semantic output 324 and the second semantic output 326 are swapped for sentence reconstruction. Similarly, a second decoder output 350 comprising predicted embeddings of a second reconstructed sentence $\bar{x}_2$ and predicted weights $\bar{f}_2$ is generated (430) from the second syntactic output 328 and the first semantic output 324, instead of from the second syntactic output 328 and the second semantic output 326.

In one or more embodiments, the PRL may involve more variables, including the global latent factor $z_0$ and the focus mask variables $f^k$. In view of the description in FIG. 3 and FIG. 4, the PRL may be defined as:

$$\mathbb{E}_{\substack{z_{sem(2)} \sim q_\phi^e(1) \\ z_{syn(1)} \sim q_\phi^e(2)}} \left[-\log p_\theta^d(x_1|(z_{sem(2)}, z_{0(2)})(z_{syn(1)}, z_{0(1)}))\right] + \quad (13)$$

$$\mathbb{E}_{\substack{z_{sem(2)} \sim q_\phi^e(3) \\ z_{syn(1)} \sim q_\phi^e(4)}} \left[-\log p_\theta^d(x_2|(z_{sem(1)}, z_{0(1)})(z_{syn(2)}, z_{0(2)}))\right]$$

Where $q_\phi^e(1) = q\phi e((z,z_0)_{sem}|x_2, f_2)$, $q_\phi^e(2) = q_\phi^e((z,z_0)_{syn}|x_1, f_1)$, $q_\phi^e(3) = q_\phi^e((z,z_0)_{sem}|x_1, f_1)$, and $q_\phi^e 4 = q_\phi^e((z,z_0)_{syn}|x_2, f_2)$.

2. Embodiments of Paraphrase Loss

In one or more embodiments, Discriminative Paraphrase Loss (DPL) may be used to encourage sentences with paraphrase relationships to have higher similarities while those without such relationships to have lower similarities. Because paraphrase relationship is defined in the sense of semantic similarity, DPL is only calculated with samples from vMF distributions. In one or more embodiments, the DPL may be defined as, $$\max(0; \delta - \text{dist}(x_1, x_2) + \text{dist}(x_1, n_1)) + \max(0; \delta - \text{dist}(x_1, x_2) + \text{dist}(x_2, n_2)) \quad (14)$$

Where dist refers to the distance, $x_1$ and $x_1$ are sentences with paraphrase relationship while $x_1$ and $n_1$ are those without paraphrase relationships. In one or more embodiments, the similarity function is a cosine similarity between the mean directions of the semantic variables from the two sentences $\text{dist}(x_1, x_2) = \text{cosine}(\mu(x_1), \mu(x_2))$.

3. Embodiments of Word Position Loss

DPL focuses on computing the loss from semantic modeling, and therefore may not handle word order relations. In one or more embodiments, a word position loss (WPL) is used to guide the representation learning of the syntactic variable. This makes up the defects of word averaging encoders since the encoders only consider bag of words and accordingly lose the word order information. WPL can even help the Reconstruction of LSTMAVG since WPL help reconstruct the order explicitly. In one or more embodiments, for both word averaging encoders and LSTM encoders, WPL is parameterized with a three-layer feedforward neural network f(•). The concatenation of the samples of the syntactic variables $z_{syn}$ and the embedding vector $emb_i$ at the word position i are formed the input for the network. In the decoder stage, the position representation at position i is predicted as a one-hot vector. The corresponding equation is defined as, $$WPL = \mathbb{E}_{z_{syn} \sim q_\phi(z|x)} \left[ \sum_i \text{logsoftmax}(f([e_i; z_{syn} \sim]))_i \right] \quad (15)$$

Where softmax(•)$_i$ indicates the probability of position i.

E. Some Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

In one or more experimental settings, a training set was formed by sub sampling paraphrase pairs from a dataset, and a different dataset was used as a development set. For semantic similarity evaluation, some other test sets were used.

1. Setup

At the start of experiment, some related hyperparameters, including dimensions of the latent variables, word embeddings, learning rates, and loss weights, need to be set up. The scale of the paraphrase data set may not be large; therefore, both the dimensions of hidden variables and word embeddings are set to 50. There are several reasons for number 50 to be selected as the dimension of both. Firstly, it is found that larger dimensions do not hurt the performances much. However, no extra benefits may be found either. Furthermore, smaller dimensions may speed up experiments. Finally and more importantly, topic discoveries in DecVAE embodiments are along with the word embeddings.

In one or more settings, hidden dimensions were aligned with that of word embeddings. Weights were also tuned for PRL, reconstruction loss, the KL divergence between attentions $f^k$ and $\tilde{f}^k$ from 0.1 to 1 in increments of 0.1 based on the development set performance. One sample from each latent variable is utilized during training. When evaluating DecVAE based models on STS tasks, the mean direction of the semantic variable was used. In contrast, the mean vector of the syntactic variable is used in syntactic similarity tasks. In one or more settings, the total correlations were mainly applied to syntactic tasks since it was found that applying total correlations to vMF distribution made the model too complicated. Hence, the framework was simplified with only KL divergence of attentions is calculated against the semantic part.

2. Baselines

It has been shown that a simple word averaging ($WORD_{AvG}$) model and a bidirectional LSTM averaging ($BLSTM_{AVG}$) model may have high competitiveness in modeling semantic similarity when trained on paraphrases. $WORD_{AvG}$ takes the average over the word embeddings in the input sequence to obtain the sentence representation. $BLSTM_{AVG}$ uses the average hidden states of a bidirectional LSTM as the sentence representation, where forward and backward hidden states are concatenated. For comparisons, several pre-trained embeddings on both semantic similarity and syntactic similarity datasets were benchmarked. One or more average strategies are taken to form sentence embeddings or hidden states. In one or more experimental settings, averaged hidden states from the last attention block are employed.

3. Semantic Similarity Evaluations

Results of semantic similarity evaluations are shown in Table 1. Results in Table 1, except entries associated with DecVAE lines, are from Chen et al., A multi-task approach for disentangling syntax and semantics in sentence representations, in *Proceedings of the* 2019 *Conference of the North American Chapter of the Association for Computational Linguistics: Human Language Technologies*, which is incorporated by reference herein in its entirety. Specifically, the upper rows shows how similarity may be modeled when trained on paraphrases. These models use 50-dimensional word embeddings and 50-dimensional LSTM hidden vectors per direction. DPL is only used for training. As shown in the table 1 DecVAE $WORD_{AvG}$ achieves the best semantic score for both STS avg metric and STS bm metric. Nonetheless, those differences seem somewhat trivial for results for all VGVAE and DecVAE. Meanwhile, LSTM-based model did not show advantages yet, which may be related to the insufficient training epochs considering the complexity of $LSTM_{AVG}$ over $WORD_{AvG}$. It may be seen from Table 1 that VAE-based language modeling may capture semantics quite well no matter what variations are made.

Table 1 also displays remarkable differences between semantic and syntactic metrics. The differences show whether semantic variables can better capture semantic information than syntactic variables. Results for embodiments of the present disclosure were listed in entries associated with DecVAE lines. As shown there, the semantic and syntactic variables of the base VGVAE model show similar performance on the STS test sets. With more losses being added, the performance of these two variables gradually diverges, indicating that different information is captured in the two variables. It may be seen that the various losses play essential roles in the disentanglement of semantics and syntax in VGVAE. The last two lines are the preliminary results of two embodiments of DecVAE model, DecVAE+ $WORD_{AVG}$, and DecVAE+$LSTM_{AVG}$. In one or more embodiments, the global latent variable $z_0$, the focus mask variable $f_k$, and the condition probability $p^d(x|z_k, z_{0(k)})$ are obtained from the decoder. In one or more embodiments, the KL divergences of the total correlation and other ones were partially deployed. As shown in Table 1, competitive results for embodiments of the present disclosure were obtained, with an ability to disentangle semantics and syntax in a clear-cut line.

Figure 5:
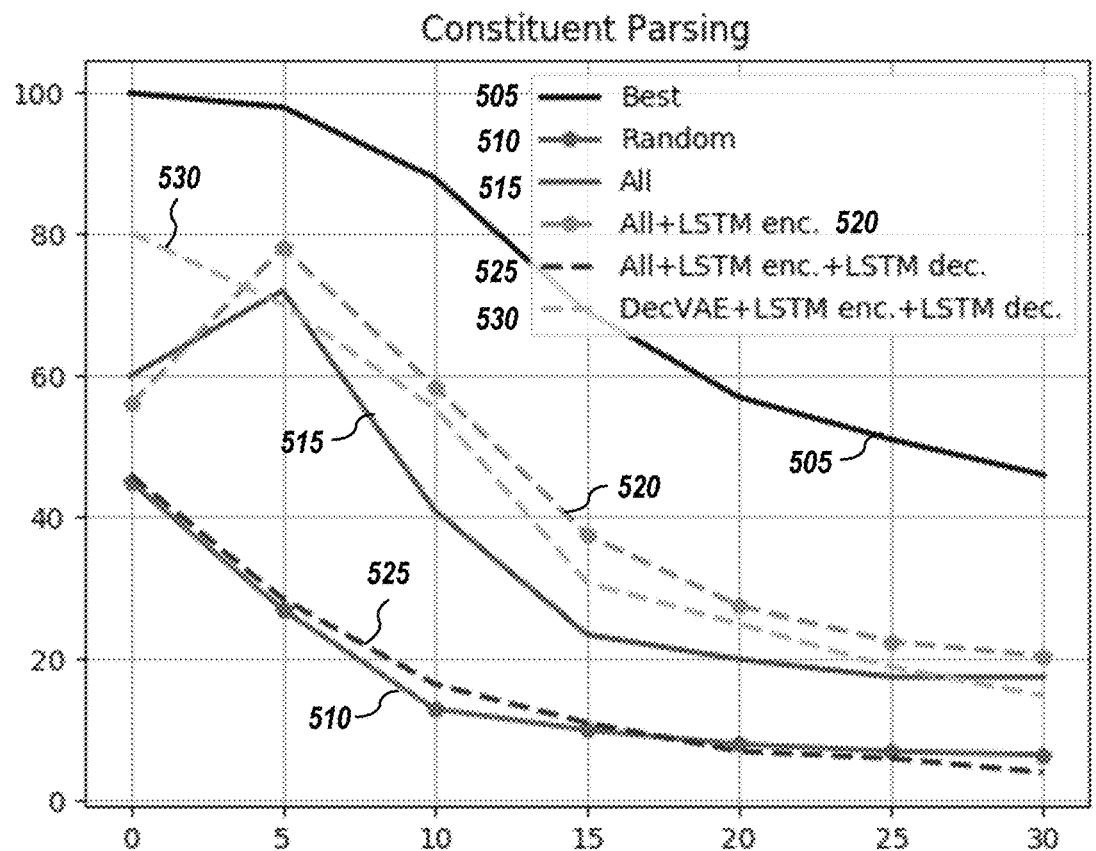
FIG. 5 graphically depicts constituency parsing F1 scores by sentence length, according to embodiments of the present disclosure.
Figure 6:
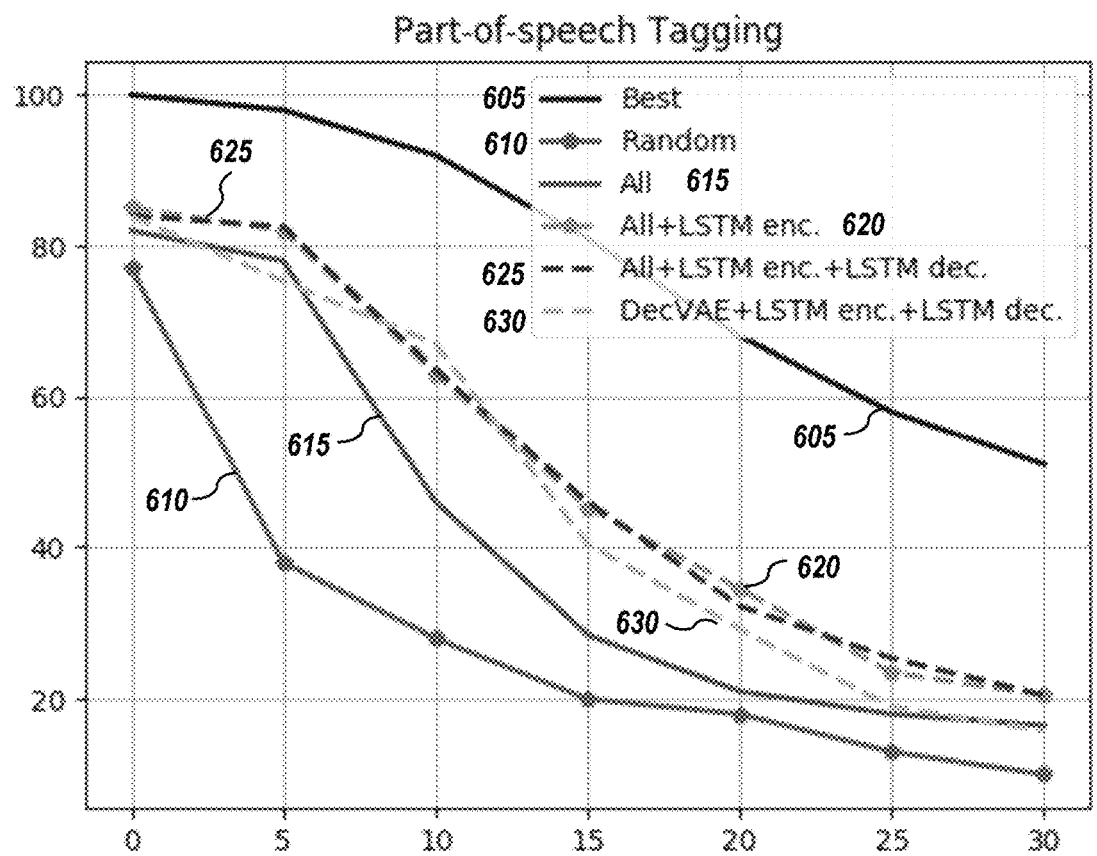
FIG. 6 graphically depicts part-of-speech tagging accuracy by sentence length, according to embodiments of the present disclosure.

Performances of DecVAE model embodiments and baselines as the length of the target sentence increases are plotted in FIG. 5 and FIG. 6. A similar trend may be seen from the figures, i.e., the longer the sentence, the worse the performance. FIG. 5 depicts constituency parsing F1 scores by sentence length, for 1-nearest neighbor parsers based on semantic and syntactic variables. The parsers include an ALL model 515, an ALL model with LSTM encoder 520, an ALL model with LSTM encoder and an LSTM decoder 525, a DecVAE model with LSTM encoder and an LSTM decoder 530, a random baseline 510, and an oracle nearest neighbor parser ("Best") 505. FIG. 6 depicts part-of-speech tagging accuracy by sentence length, for 1-nearest neighbor parsers based on semantic and syntactic variables. The parsers include an ALL model 615, an ALL model with LSTM encoder 620, an ALL model with LSTM encoder and an LSTM decoder 625, a DecVAE model with LSTM encoder and an LSTM decoder 630, a random baseline 610, and an oracle nearest neighbor parser ("Best") 605. In FIG.

5 and FIG. 6, "ALL" indicates all of the multi-task losses of a VGVAE model are used. The DecVAE frameworks 530 and 630 are close to the top and have a more predictable trend.

TABLE 1

Pearson correlation (%) for various STS test sets, bm: STS benchmark test set. avg: the average of Pearson correlation for each domain in the STS test sets. Results are in bold if they are highest in the "semantic variable" columns or lowest in the "syntactic variable" columns. "ALL" indicates all of the multi-task losses of VGVAE are used. The last line shows the results of DecVAE model embodiments. Results, except entries associated with DecVAE lines, are from Chen et al., A multi-task approach for disentangling syntax and semantics in sentence representations, in *Proceedings of the 2019 Conference of the North American Chapter of the Association for Computational Linguistics: Human Language Technologies*, which is incorporated by reference herein in its entirety.

|  | semantic var. | | syntactic var. | |
| --- | --- | --- | --- | --- |
|  | bm | avg | bm | avg |
| GloVe | 39.0 | 48.7 | — | — |
| SkipThought | 42.0 | 42.0 | — | — |
| InferSent | 67.8 | 61.0 | — | — |
| ELMo | 57.7 | 60.3 | — | — |
| VGVAE WORD$_{AVG}$ | 71.9 | 64.8 | — | — |
| VGVAE BLSTTM$_{AVG}$ | 71.4 | 64.4 | — | — |
| DecVAE WORD$_{AVG}$ | 72.4 | 65.67 | — | — |
| DecVAE BLSTTM$_{AVG}$ | 70.6 | 62.39 | — | — |
| VGVAE | 45.5 | 42.7 | 40.8 | 43.2 |
| VGVAE + WPL | 51.5 | 49.3 | 28.1 | 31.0 |
| VGVAE + DPL | 68.4 | 58.2 | 37.8 | 40.5 |
| VGVAE + PRL | 67.9 | 57.8 | 29.6 | 32.7 |
| VGVAE + PRL + WPL | 69.8 | 61.3 | 23.2 | 27.91 |
| VGVAE + PRL + DPL | 71.2 | 64.2 | 31.7 | 33.9 |
| VGVAE + DPL + WPL | 71.0 | 63.5 | 24.1 | 29.0 |
| VGVAE ALL | 72.3 | 65.1 | 20.1 | 24.2 |
| VGVAE ALL + LSTM enc | 72.5 | 65.1 | 16.3 | 24.5 |
| VGVAE ALL + LSTM enc & dec. | 72.9 | 65.1 | 11.3 | 19.3 |
| DecVAE + WORD$_{AVG\ enc}$ | 73.91 | 64.04 | 22.34 | 17.72 |
| DecVAE + LSTM enc | 70.8 | 62.04 | 25.24 | 26.46 |

4. Syntactic Similarity Evaluations

In one or more experimental settings, syntactic variables were utilized to calculate nearest neighbors for a 1-nearest-neighbor syntactic parser or part-of-speech (POS) tagger. Several metrics are employed then to evaluate the quality of the output parses and tagging sequences. One point worth mentioning is that this evaluation did not show how good the parsing may be. Instead, similar to the semantic similarity, it revealed that syntactic variables may capture more syntactic information than semantic variables.

In one or more experimental settings, labeled F1 of constituent parsing and accuracy of POS tagging were reported. Table 2 comprises results from VGVAE models, and DecVAE embodiments. Although only word embedding average is tested, DecVAE embodiments outperform VGVAE in both parsing and tagging. For lower part in Table 2, in contrast to semantic similarity, syntactic variables are expected to boost both tasks while semantic variables to worsen them. VGVAE was used as the baseline in Table 2. Both semantic and syntactic variables for VGVAE have similar accuracy for two tasks. Then, with the addition of diverse losses, expected performance differences appear more obvious. Table 2 shows that the differences between the semantic variable and the syntactic variable are mostly remarkable for DecVAE compared with variations of VGVAE, although the semantic variable for DecVAE is not the worst and the syntactic variable for DecVAE is not the best. Such a biggest difference shows good disentanglement of syntax and semantics learned in DecVAE. Table 2 also suggests that syntactic evaluation results, in general, are not as evident as the semantic evaluation results.

TABLE 2

Syntactic similarity evaluations, labeled F1 score for constituent parsing, and accuracy (%) for part-of-speech tagging. Numbers are bold if they are worst in the "semantic variable" column or best in the "syntactic variable" column. "ALL" indicates all the multi-task losses are used. Results, except entries associated with DecVAE lines, are from Chen et al., A multi-task approach for disentangling syntax and semantics in sentence representations, in *Proceedings of the 2019 Conference of the North American Chapter of the Association for Computational Linguistics: Human Language Technologies*, which is incorporated by reference herein in its entirety.

|  | Constituent Parsing (F$_1$, ↑). | | POS Tagging (% Acc., ↑). | |
| --- | --- | --- | --- | --- |
| VGVAE WORD$_{AVG}$ | 25.5 | | 21.4 | |
| VGVAE BLSTTM$_{AVG}$ | 25.7 | | 21.6 | |
| DecVAE WORD$_{AVG}$ | 27.87 | | 24.93 | |
|  | semV. | synV | semV | synV |
| VGVAE | 25.2 | 25.0 | 21.1 | 21.0 |
| VGVAE + WPL | 24.1 | 28.2 | 20.3 | 24.2 |
| VGVAE + DPL | 25.1 | 26.1 | 21.3 | 21.8 |
| VGVAE + PRL | 24.7 | 26.9 | 21.0 | 22.2 |
| VGVAE + PRL + WPL | 25.1 | 28.8 | 21.5 | 24.6 |
| VGVAE + PRL + DPL | 25.0 | 26.2 | 21.1 | 22.1 |
| VGVAE + DPL + WPL | 24.4 | 28.1 | 20.6 | 23.6 |
| DecVAE + DPL + WPL | 24.9 | 27.90 | 20.41 | 24.93 |

5. Some Decoder Quality Analysis

Besides the above quantitative results on the semantic and syntactic similarities, a quality analysis of the decoder results was also made. In one or more settings, cosine similarity metrics were employed to find nearest neighbor sentences to test set examples in terms of both semantic and syntactic representations. It was found that the nearest neighbors of words had similar approaches. Meanwhile, due to the integration of the attention network and total correlations, it is found that embodiments of the presented WORD$_{AvG}$ may achieve better results than the LSTM$_{AVG}$. This shows the benefits of the combination of those two components.

F. Some Conclusions

In the present disclosure, embodiments of a method named decomposable variational autoencoder (DecVAE) are presented to disentangle syntax and semantics in a sentence. Experimental results show that embodiments of DecVAE may achieve comparable results in semantic similarity and syntax similarity to the SOTA.

In summary, the present disclosure provides embodiments to hierarchically integrate sentence and word representation learning. The attention and segmentation mechanism improve the interpretability of both word and sentence embeddings. Fine-grained representation learning may be further explored for both words and sentences. Fine-grained representation of words and sentences may be essential for many applications such as controllable text generation.

Additionally, although the advantages of LSTM$_{AVG}$ is not explicitly shown in embodiments of the present disclosure, LSTM may be more capable of catching syntactic features than WORD$_{AVG}$ in theory, embodiments of the DecVAE framework may be further improved with LSTM. Furthermore, embodiments of the DecVAE framework may be further extended with diverse variations of total correlations. Such an extension may include implementing simpler KL divergence between predicted attentions from decoders and attentions obtained from an attention network and implementing with deeper mutual information between distributions of hidden variables and those with variational approximation. In one or more embodiments, the total correlations may be applied to the semantic topics, which are modeled with vMF distributions. In one or more embodiments, semantics may be further modeled with manifold transformations.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 7:
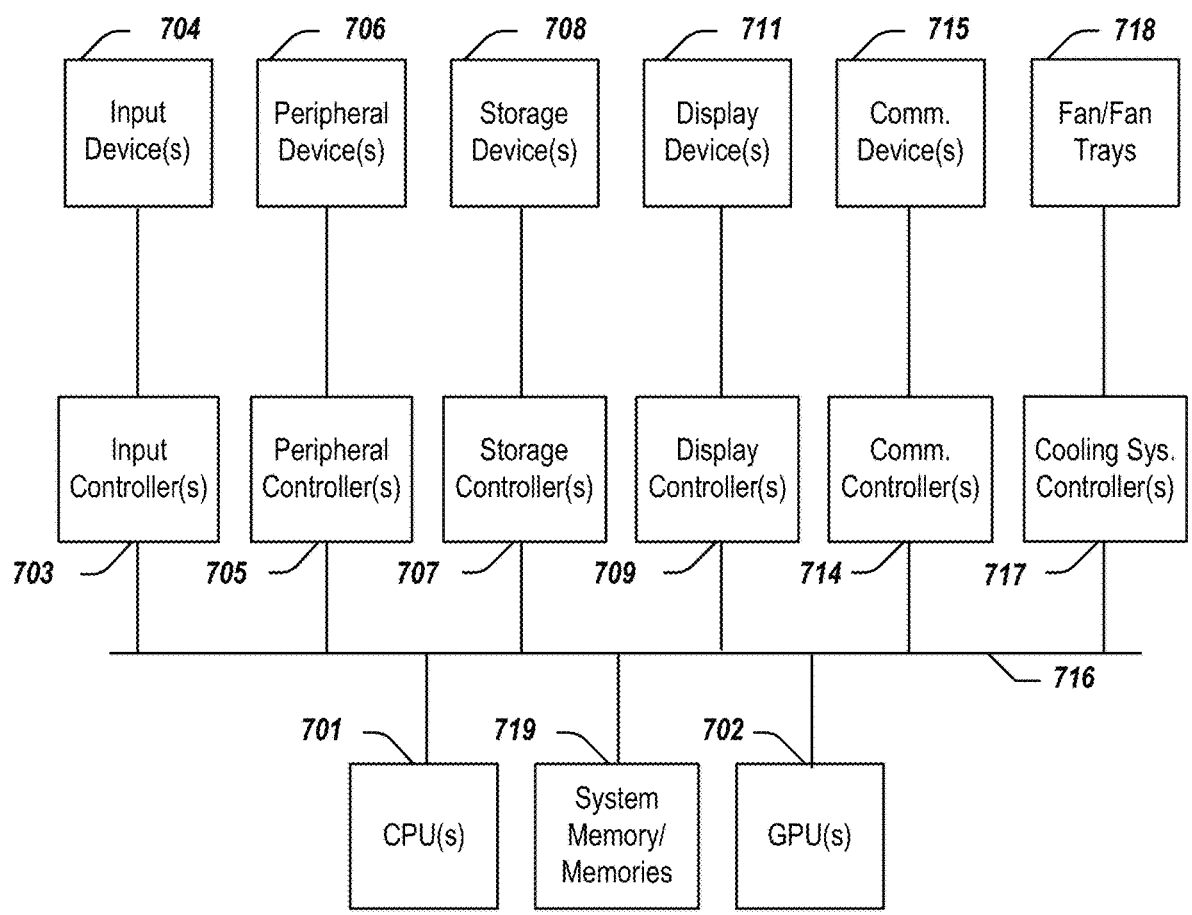
FIG. 7 depicts a simplified block diagram of a computing device/information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provide computing resources and controls the computer. CPU 701 may be implemented with a microprocessor or the like, and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for representation disentanglement comprising:
   receiving an input of a sequence of tokens;
   generating, using a first combination comprising a first embedding layer and a first attention layer, a first sequence of hidden variables based on the sequence of tokens;
   generating, using a second combination comprising a second embedding layer and a second attention layer, a second sequence of hidden variables based on the sequence of tokens;
   generating, using a semantic encoder, a sequence of semantic hidden variables based on the first sequence of hidden variables;
   generating, using a syntax encoder, a sequence of syntactic hidden variables based on the second sequence of hidden variables;
   generating, using a decoder, a sequence of reconstructed tokens and a corresponding sequence of reconstructed attention weights based on the sequence of semantic hidden variables and the sequence of syntactic hidden variables; and
   outputting the sequence of reconstructed tokens and the corresponding sequence of reconstructed attention weights.

2. The computer-implemented method of claim 1 wherein:
   the step of generating the first sequence of hidden variables based on the sequence of tokens comprises:
      generating, at the first embedding layer, a first sequence of embedding vectors and a first sequence of masks from the sequence of tokens;
      generating, using the first attention layer, a first sequence of attention weights based on the first sequence of embedding vectors and the first sequence of masks; and
      obtaining the first sequence of hidden variables by an element-wise multiplication between the first sequence of embedding vectors and the first sequence of attention weights; and
   the step of generating the second sequence of hidden variables based on the sequence of tokens comprises:
      generating, at the second embedding layer, a second sequence of embedding vectors and a second sequence of masks from the sequence of tokens;
      generating, using the second attention layer, a second sequence of attention weights based on the second sequence of embedding vectors and the second sequence of masks; and
      obtaining the second sequence of hidden variables by an element-wise multiplication between the second sequence of embedding vectors and the second sequence of attention weights.

3. The computer-implemented method of claim 1 wherein:
   each semantic hidden variable of the sequence of semantic hidden variables comprises a local semantic hidden variable and a global semantic hidden variable; and
   each syntactic hidden variable of the sequence of syntactic hidden variables comprises a local syntactic hidden variable and a global syntactic hidden variable.

4. The computer-implemented method of claim 1 wherein the first embedding layer and the second embedding layer share parameters.

5. The computer-implemented method of claim 1 wherein the first embedding layer is also the second embedding layer.

6. The computer-implemented method of claim 1 wherein the sequence of reconstructed tokens and the corresponding sequence of reconstructed attention weights are used for constructing one or more loss functions to train at least one of the first embedding layer, the second embedding layer, the first attention layer, the second attention layer, the semantic encoder, the syntax encoder, and the decoder, at least one of the one or more loss functions comprises a Kullback-Leibler (KL) divergence for the semantic encoder and a KL divergence for the syntax encoder.

7. The computer-implemented method of claim 1 wherein the sequence of semantic hidden variables and the sequence of syntactic hidden variables are concatenated together into the decoder to generate the sequence of reconstructed tokens and the corresponding sequence of reconstructed attention weights.

8. The computer-implemented method of claim 1 wherein at least two consecutive semantic hidden variables in the sequence of semantic hidden variables are swapped for the generation of the sequence of reconstructed tokens and the corresponding sequence of reconstructed attention weights.

9. A system for representation disentanglement comprising:
one or more processors; and
a non-transitory computer-readable medium or media comprising one or more sets of instructions which, when executed by at least one of the one or more processors, causes steps to be performed comprising:
generating, using a first combination comprising a first embedding layer and a first attention layer, a first sequence of hidden variables based on a sequence of tokens;
generating, using a second combination comprising a second embedding layer and a second attention layer, a second sequence of hidden variables based on the sequence of tokens;
generating, using a semantic encoder, a sequence of semantic hidden variables based on the first sequence of hidden variables;
generating, using a syntax encoder, a sequence of syntactic hidden variables based on the second sequence of hidden variables;
generating, using a decoder, a sequence of reconstructed tokens and a corresponding sequence of reconstructed attention weights based on the sequence of semantic hidden variables and the sequence of syntactic hidden variables; and
outputting the sequence of reconstructed tokens and the corresponding sequence of reconstructed attention weights.

10. The system of claim 9 wherein:
generating the first sequence of hidden variables based on the sequence of tokens comprises:
generating, at the first embedding layer, a first sequence of embedding vectors and a first sequence of masks from the sequence of tokens;
generating, using the first attention layer, a first sequence of attention weights based on the first sequence of embedding vectors and the first sequence of masks; and
obtaining the first sequence of hidden variables by an element-wise multiplication between the first sequence of embedding vectors and the first sequence of attention weights; and
generating the second sequence of hidden variables based on the sequence of tokens comprises:
generating, at the second embedding layer, a second sequence of embedding vectors and a second sequence of masks from the sequence of tokens;
generating, using the second attention layer, a second sequence of attention weights based on the second sequence of embedding vectors and the second sequence of masks; and
obtaining the second sequence of hidden variables by an element-wise multiplication between the second sequence of embedding vectors and the second sequence of attention weights.

11. The system of claim 9 wherein each semantic hidden variable of the sequence of semantic hidden variables comprises a local semantic hidden variable and a global semantic hidden variable, each syntactic hidden variable of the sequence of syntactic hidden variables comprises a local syntactic hidden variable and a global syntactic hidden variable.

12. The system of claim 9 wherein the first embedding layer and the second embedding layer share parameters.

13. The system of claim 9 wherein the first embedding layer is also the second embedding layer.

14. The system of claim 9 wherein the sequence of reconstructed tokens and the corresponding sequence of reconstructed attention weights are used for constructing one or more loss functions to train at least one of the first embedding layer, the second embedding layer, the first attention layer, the second attention layer, the semantic encoder, the syntax encoder, and the decoder, at least one of the one or more loss functions comprises a Kullback-Leibler (KL) divergence for the semantic encoder and a KL divergence for the syntax encoder.

15. A non-transitory computer-readable medium or media comprising one or more sequences of instructions which, when executed by at least one processor, causes steps for representation disentanglement comprising:
generating, using a first combination comprising a first embedding layer and a first attention layer, a first sequence of hidden variables based on a sequence of tokens;
generating, using a second combination comprising a second embedding layer and a second attention layer, a second sequence of hidden variables based on the sequence of tokens;
generating, using a semantic encoder, a sequence of semantic hidden variables based on the first sequence of hidden variables;
generating, using a syntax encoder, a sequence of syntactic hidden variables based on the second sequence of hidden variables;
generating, using a decoder, a sequence of reconstructed tokens and a corresponding sequence of reconstructed attention weights based on the sequence of semantic hidden variables and the sequence of syntactic hidden variables; and
outputting the sequence of reconstructed tokens and the corresponding sequence of reconstructed attention weights.

16. The non-transitory computer-readable medium or media of claim 15 wherein:
generating the first sequence of hidden variables based on the sequence of tokens comprises:
generating, at the first embedding layer, a first sequence of embedding vectors and a first sequence of masks from the sequence of tokens;
generating, using the first attention layer, a first sequence of attention weights based on the first sequence of embedding vectors and the first sequence of masks; and
obtaining the first sequence of hidden variables by an element-wise multiplication between the first sequence of embedding vectors and the first sequence of attention weights; and
generating the second sequence of hidden variables based on the sequence of tokens comprises:
generating, at the second embedding layer, a second sequence of embedding vectors and a second sequence of masks from the sequence of tokens;
generating, using the second attention layer, a second sequence of attention weights based on the second sequence of embedding vectors and the second sequence of masks; and
obtaining the second sequence of hidden variables by an element-wise multiplication between the second sequence of embedding vectors and the second sequence of attention weights.

17. The non-transitory computer-readable medium or media of claim 15 wherein the second combination is fully independent from the first combination without parameter sharing.

18. The non-transitory computer-readable medium or media of claim 15 wherein the first embedding layer and the second embedding layer share parameters, or the first embedding layer is also the second embedding layer.

19. The non-transitory computer-readable medium or media of claim 15 wherein each semantic hidden variable of the sequence of semantic hidden variables comprises a local semantic hidden variable and a global semantic hidden variable, each syntactic hidden variable of the sequence of syntactic hidden variables comprises a local syntactic hidden variable and a global syntactic hidden variable.

20. The non-transitory computer-readable medium or media of claim 15 wherein the sequence of reconstructed tokens and the corresponding sequence of reconstructed attention weights are used for constructing one or more loss functions to train at least one of the first embedding layer, the second embedding layer, the first attention layer, the second attention layer, the semantic encoder, the syntax encoder, and the decoder, at least one of the one or more loss functions comprises loss comprises a Kullback-Leibler (KL) divergence for the semantic encoder and a KL divergence for the syntax encoder.

* * * * *